US006928426B2

(12) United States Patent
Dake

(10) Patent No.: US 6,928,426 B2
(45) Date of Patent: Aug. 9, 2005

(54) METHOD AND APPARATUS TO IMPROVE FILE MANAGEMENT

(75) Inventor: Steven C. Dake, Tempe, AZ (US)

(73) Assignee: Intel Corporation, Santa Clara, CA (US)

(*) Notice: Subject to any disclaimer, the term of this patent is extended or adjusted under 35 U.S.C. 154(b) by 121 days.

(21) Appl. No.: 09/751,862

(22) Filed: Dec. 30, 2000

(65) Prior Publication Data

US 2002/0138501 A1 Sep. 26, 2002

(51) Int. Cl.⁷ .......................... G06F 17/30; G06F 12/00
(52) U.S. Cl. ..................................... 707/2; 707/200
(58) Field of Search .................. 707/2, 200, 3–10, 707/100–102, 103.2, 205; 709/223, 203, 220–224; 716/16; 702/61–62; 382/100; 725/100, 139, 36, 91, 93

(56) References Cited

U.S. PATENT DOCUMENTS

| | | | | |
|---|---|---|---|---|
| 5,619,690 A | * | 4/1997 | Matsumani et al. | 707/200 |
| 5,623,600 A | * | 4/1997 | Ji et al. | 713/201 |
| 5,742,817 A | | 4/1998 | Pinkoski | |
| 6,088,659 A | * | 7/2000 | Kelley et al. | 702/62 |
| 6,112,263 A | | 8/2000 | Futral | 710/37 |
| 6,134,617 A | | 10/2000 | Weber | 710/105 |
| 6,249,782 B1 | * | 6/2001 | Day et al. | 707/2 |
| 6,286,045 B1 | * | 9/2001 | Griffiths et al. | 709/224 |
| 6,442,548 B1 | * | 8/2002 | Balabine et al. | 707/10 |
| 6,650,761 B1 | * | 11/2003 | Rodriguez et al. | 382/100 |

OTHER PUBLICATIONS

B. Callaghan, "WebNFS Client Specification," Request for Comments 2054, Oct. 1996, pp. 1–16, XP: 002242530, Retrieved from the Internet on May 26, 2003: <ietf.org/rfc/rfc2054.txt>.
B. Friesenhahn, "A File System for the Web," BYTE, Nov. 1, 1996, vol. 21, No. 11, pp. 63–64, XP: 000641067, McGraw–Hill, Inc., St. Peterborough, USA.
B. Pawlowski et al., "The NFS Version 4 Protocol," Proceedings of 2nd International SANE Conference, May 22–25, 2000, pp. 1–20, XP: 002262978, Maastricht, The Netherlands, Retrieved from the Internet on Nov. 25, 2003: <nluug.nl/events/sane2000/papers/pawlowski.pdf>.

* cited by examiner

Primary Examiner—Uyen Le
Assistant Examiner—Susan Y Chen
(74) Attorney, Agent, or Firm—Kacvinsky LLC

(57) ABSTRACT

Techniques to manage a file are described. An apparatus may comprise a file system interface for a client to receive a request for a file having a file name. The client may generate a unique identifier for the file name in response to the request using a stream cone messaging system, with the unique identifier to represent the file name and comprising a fewer number of bits than the file name. An interconnect system connected to the client may communicate the unique identifier and file name to the server. Other embodiments are described and claimed.

26 Claims, 6 Drawing Sheets

METHOD AND APPARATUS TO IMPROVE FILE MANAGEMENT

FIELD

This disclosure relates to computer and communication systems. More particularly, it relates to methods and apparatus to improve file management within a computer and communication system.

BACKGROUND

Computer and communications systems are frequently similar in architecture. Each system may comprise a number of separate components each designed to perform certain functions. The components may communicate information to other components over an interconnect system. An interconnect system operates to manage the transfer of information over a communications medium, such as metal leads, twisted-pair wire, co-axial cable, fiber optics, radio frequencies and so forth. Communications between components typically help coordinate operations of the individual components so that they may act as a cohesive system. This type of distributed system architecture may provide certain advantages in terms of performance, redundancy, scalability and efficiency.

There are disadvantages, however, associated with this type of system design. One disadvantage is that a component may have to remain idle as it waits for information from another component. Idle time may represent an inefficient use of system resources. Another disadvantage is that functionality may be allocated to components in a manner that increases the amount of information communicated between components. This increase in communications increases demands on the finite resources of the interconnect system.

BRIEF DESCRIPTION OF THE DRAWINGS

The subject matter regarded as embodiments of the invention is particularly pointed out and distinctly claimed in the concluding portion of the specification. Embodiments of the invention, however, both as to organization and method of operation, together with objects, features, and advantages thereof, may best be understood by reference to the following detailed description when read with the accompanying drawings in which:

DETAILED DESCRIPTION

Figure 1:
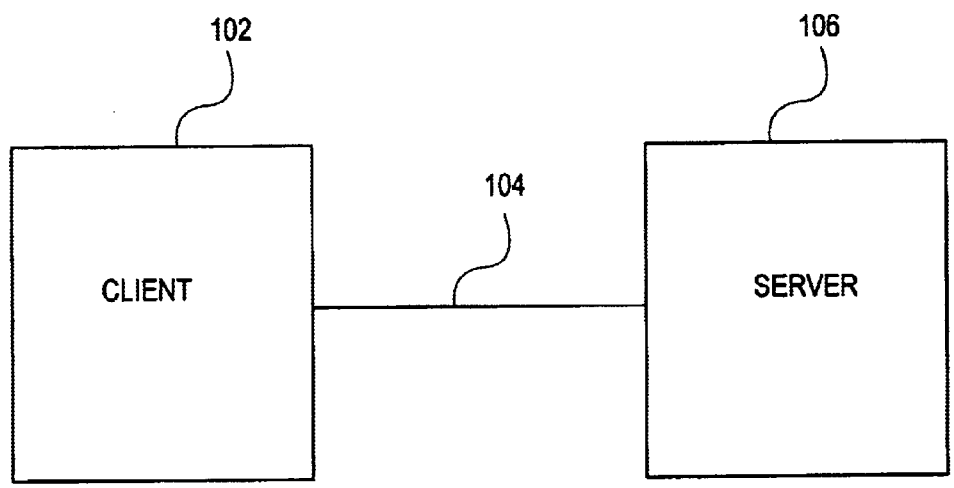
FIG. 1 is a system suitable for practicing one embodiment of the invention.

In the following detailed description, numerous specific details are set forth in order to provide a thorough understanding of the embodiments of the invention. It will be understood by those skilled in the art, however, that the embodiments of the invention may be practiced without these specific details. In other instances, well-known methods, procedures, components and circuits have not been described in detail so as not to obscure the embodiments of the invention.

Embodiments of the invention may improve performance of a distributed system by reducing idle time for distributed components as well as bandwidth demands for the interconnect system. More particularly, one embodiment of the invention may improve performance of a distributed system used for file management. Consequently, this may reduce delays associated with file operations. Accordingly, a user may benefit in terms of more responsive applications and services.

A file management system typically comprises a client and a server. A client in this context may refer to a requester of services. A server in this context may refer to a provider of services. The client typically sends a file request to a server over an interconnect system. The file request may be in the form of a message, and may include a function request and a file name. A message in this context may comprise one or more alphanumeric characters, symbols or logical expressions that when combined represent, for example, control words, commands, instructions, information or data. The message could vary in composition from a single bit to entire phrases, for example. The server associates a unique identifier with the file name, identifies location information for the file, and stores it with the unique identifier. The server then sends the unique identifier back to the client. The client receives the unique identifier and uses it in lieu of the file name for subsequent file requests.

A unique identifier is assigned to a file name to reduce bandwidth demands on the interconnect systems. A file name may comprise a number of alphanumeric characters or symbols ("character string"), for example. Each character or symbol is converted to one or more bits, typically with 8 bits (e.g., 1 byte) per character. Since a file name may comprise many characters, the interconnect system may have to transport a relatively large number of bits. To reduce this problem, the server may assign a unique identifier to each file name and sends the unique identifier to the client. The unique identifier is typically smaller in length than the file name. For example, a unique identifier may have a length of 32 or 64 bits. The client may then use the unique identifier for subsequent file requests.

There are disadvantages, however, to having the server assign a unique identifier to a file name. One disadvantage is that the client may have to remain idle as it waits for the unique identifier prior to processing subsequent file request. Another disadvantage is that the client and server may need to communicate more information than necessary, thereby increasing demands on the interconnect system.

With respect to the first disadvantage, the client may have to remain idle as it waits for the unique identifier from the server. To initiate the assignment process, the client sends a message to the server requesting assignment of a unique identifier to a file name. The server associates a unique identifier with the file name, identifies location information for the file, and stores it with the unique identifier. The server then sends a message with the unique identifier back to the client. While waiting to receive the unique identifier from the server, the client may receive subsequent file requests with the same file name. The client may not be able to begin processing these file requests until the entire assignment process is completed. As a result, the client may be forced to remain idle during this time period.

With respect to the second disadvantage, the client and server may need to communicate unnecessary information to perform the assignment function, thereby increasing demands on the interconnect system. A file management system as described above requires at least two messages. The client sends a first message to the server requesting assignment of a unique identifier to a file name. The server sends a second message to the client with the unique identifier. Each message requires use of a certain amount of bandwidth from the interconnect system. Bandwidth in this context may refer to the speed at which information can be transferred over an interconnect system, and is typically measured in kilobits per second (kbps). By way of contrast, one embodiment of the invention may perform the assignment process using only one message, thereby potentially reducing bandwidth demands on the interconnect system by as much as 50%.

Embodiments of the invention may improve performance of a distributed system by reducing idle time for a client as well as bandwidth demands for the interconnect system. One embodiment of the invention assigns a unique identifier to a file name at the client, and sends the unique identifier to the server. This may reduce client idle time since the client may begin processing subsequent file requests without having to wait for a message from the server. This may also reduce bandwidth demands since the server does not need to send a message back to the server to complete the assignment process, or alternatively, may send a message that is shorter than those needed by previous file management systems.

It is worthy to note that any reference in the specification to "one embodiment" or "an embodiment" means in this context that a particular feature, structure, or characteristic described in connection with the embodiment may be included in at least one embodiment of the invention. The appearances of the phrase "in one embodiment" in various places in the specification do not necessarily all refer to the same embodiment.

Referring now in detail to the drawings wherein like parts are designated by like reference numerals throughout, there is illustrated in FIG. 1 a system 100 suitable for practicing one embodiment of the invention. As shown in FIG. 1, system 100 comprises a client 102 and a server 106 connected by an interconnect system 104. The term "client" as used herein may refer to any requestor of information. The term "server" as used herein may refer to any provider of information.

Figure 2:
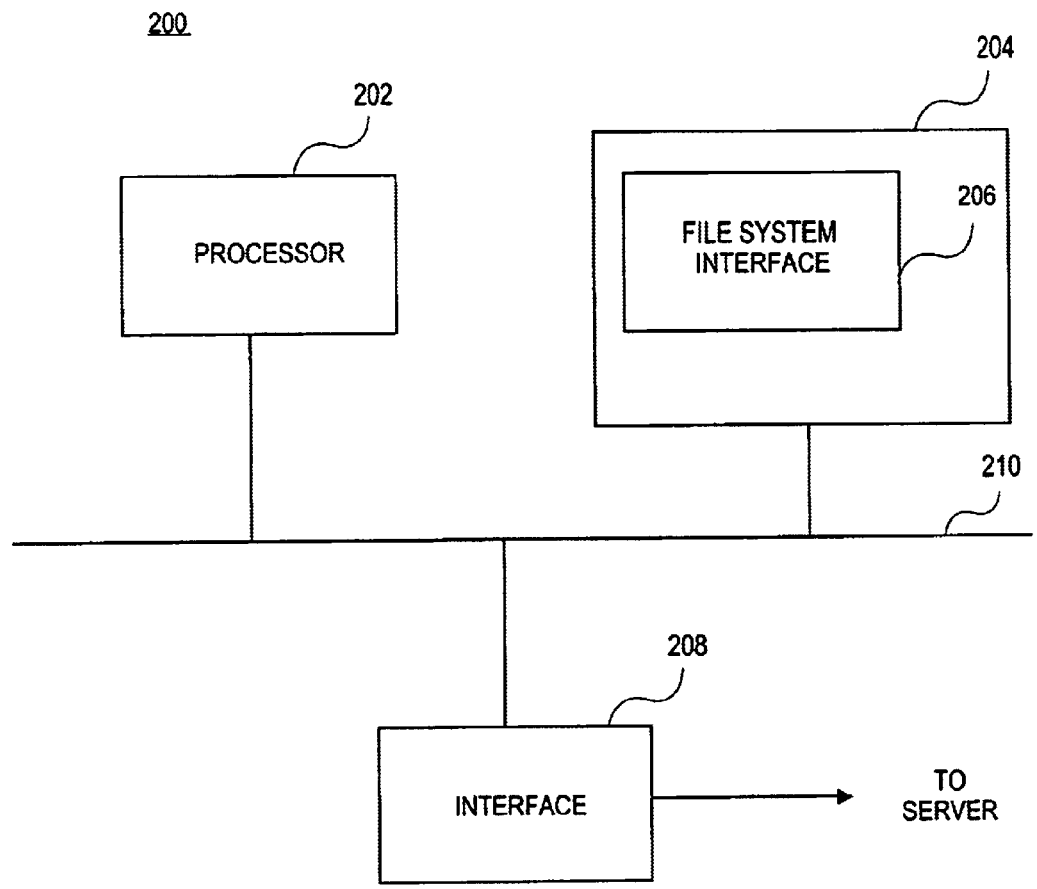
FIG. 2 is a block diagram of a client system in accordance with one embodiment of the invention.

FIG. 2 is a block diagram of a client system in accordance with one embodiment of the invention. FIG. 2 illustrates a client 200 that may be representative of client 102. As shown in FIG. 2, client 200 comprises a processor 202, a memory 204 and an interface 208, all connected by connection 210. Memory 204 may store program instructions and data. The term "program instructions" include computer code segments comprising words, values and symbols from a predefined computer language that, when placed in combination according to a predefined manner or syntax, cause a processor to perform a certain function. Examples of a computer language include C, C++ and assembly. Processor 202 executes the program instructions, and processes the data, stored in memory 204. Interface 208 coordinates the transport of data from client 200 to another device. Connection 210 transports data between processor 202, memory 204, and interface 208.

Processor 202 can be any type of processor capable of providing the speed and functionality desirable for various embodiments of the invention. For example, processor 202 could be a processor from a family of processors made by Intel Corporation, Motorola, Compaq or Sun Microsystems. In one embodiment of the invention, processor 202 may be a dedicated processor to manage input/output (I/O) devices, such as hard drives, keyboards, printers, network interface cards and so forth. This processor is typically referred to as an I/O processor (IOP).

In one embodiment of the invention, memory 204 comprises a machine-readable medium and may include any medium capable of storing instructions adapted to be executed by a processor. Some examples of such media include, but are not limited to, read-only memory (ROM), random-access memory (RAM), programmable ROM, erasable programmable ROM, electronically erasable programmable ROM, dynamic RAM, magnetic disk (e.g., floppy disk and hard drive), optical disk (e.g., CD-ROM) and any other media that may store digital information. In one embodiment of the invention, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor. Further, client 200 may contain various combinations of machine-readable storage devices through various I/O controllers, which are accessible by processor 202 and which are capable of storing a combination of computer program instructions and data.

Memory 204 may store and allow execution by processor 202 of program instructions and data to implement the functions of a client, such as client 106 and client 200. In one embodiment of the invention, memory 204 includes a set of program instructions that will be collectively referred to herein as a file system interface 206.

File system interface 206 may be an interface that operates to provide access to one or more files for system 100. An interface in this context may refer to a defined protocol by which one software module may access functionality from another software module. A file in this context refers to a discrete set of data stored in memory, such as in memory 204 or a hard drive. File system interface 206 may receive a request to perform certain operations for a file, such as create, open, seek, read, write, rename, delete, copy, move, and so forth. The request may originate from a host OS or an application program, for example. A host OS may comprise an OS for a system. For example, if an embodiment of the invention was implemented as part of a personal computer, the host OS might comprise an OS sold by Microsoft Corporation, such as Microsoft Windows® 95, 98, 2000 and NT, for example.

In one embodiment of the invention file system interface 206 operates as an Operating System Service Module (OSM) as defined by the Intelligent I/O Specification (I$_2$O) developed by the I$_2$O Special Interest Group (SIG) (I$_2$O SIG), version 1.5,adopted in April of 1997,and available from "www.i20sig.org" ("I$_2$O Specification"), although the invention is not limited in scope in this respect.

By way of background, the I$_2$O Specification defines a standard architecture for intelligent I/O that is independent of both the specific device being controlled and the host operating system (OS). Intelligent I/O in this context refers to moving the function of processing low-level interrupts from a central processing unit (CPU) or other processor to I/O processors (IOPs) designed specifically to provide processing for I/O functions. This may improve I/O performance as well as permit the CPU or other processor to provide processing functionality for other tasks. An interrupt in this context refers to a request to access an I/O device, such as a hard drive, floppy disk drive, printer, monitor, keyboard, network interface card (NIC) and so forth.

The I$_2$O Specification describes an OSM, an Intermediate Services Module (ISM) and a Hardware Device Module (HDM). The OSM may be a driver that operates as an interface between a host OS and an ISM. A driver in this context refers to a set of program instructions that manage operations of a particular component, device or software module. The ISM may operate as an interface between the OSM and a Hardware Device Module (HDM). The ISM may perform specific functionality for I/O management functions, network protocols or peer-to-peer functionality such as background archiving, for example. The HDM may be a driver that operates to control a particular I/O device.

The I$_2$O Specification defines a communications model that comprises a message-passing system. The OSM, ISM and HDM communicate and coordinate operations by passing information in the form of messages through a message layer. A message layer in this context may manage and dispatch requests, provide a set of Application Programming Interfaces (APIs) for delivering messages, and provide a set of support routines to process messages.

In one embodiment of the invention, file system interface 206 operates as an OSM in accordance with the I$_2$O Specification. In one embodiment of the invention, file system interface 206 receives file requests from an application program via the host OS, translates the request into a message in accordance with the I$_2$O Specification, and sends it to a file system manager (described below) for processing. An application program in this context refers to a program that provides a predetermined set of functions for specialized tasks, typically having a user interface to facilitate the processing of commands and instructions between a user and the computer system. Examples of application programs might include a word processor, spread sheet, database or Internet browser.

Interface 208 may comprise any suitable technique for controlling communication signals between computer or network devices using a desired set of communications protocols, services and operating procedures, for example. In one embodiment of the invention, interface 208 may operate, for example, in accordance with the PCI Specification and the I$_2$O Specification. In another embodiment of the invention, interface 208 may operate in accordance with the Transmission Control Protocol (TCP) as defined by the Internet Engineering Task Force (IETF) standard 7, Request For Comment (RFC) 793,adopted in September, 1981,and the Internet Protocol (IP) as defined by the ETF standard 5,RFC 791, adopted in September, 1981,both available from "www.ietf.org." Although interface 208 may operate with in accordance with the above described protocols, it can be appreciated that interface 208 may operate with any suitable technique for controlling communication signals between computer or network devices using a desired set of communications protocols, services and operating procedures, for example, and still fall within the scope of the invention.

Interface 208 also includes connectors for connecting interface 208 with a suitable communications medium. Interface 208 may receive communication signals over any suitable medium such as copper leads, twisted-pair wire, co-axial cable, fiber optics, radio frequencies, and so forth. In one embodiment of the invention, the connectors are suitable for use with a bus to carry signals that comply with the PCI Specification.

Figure 3:
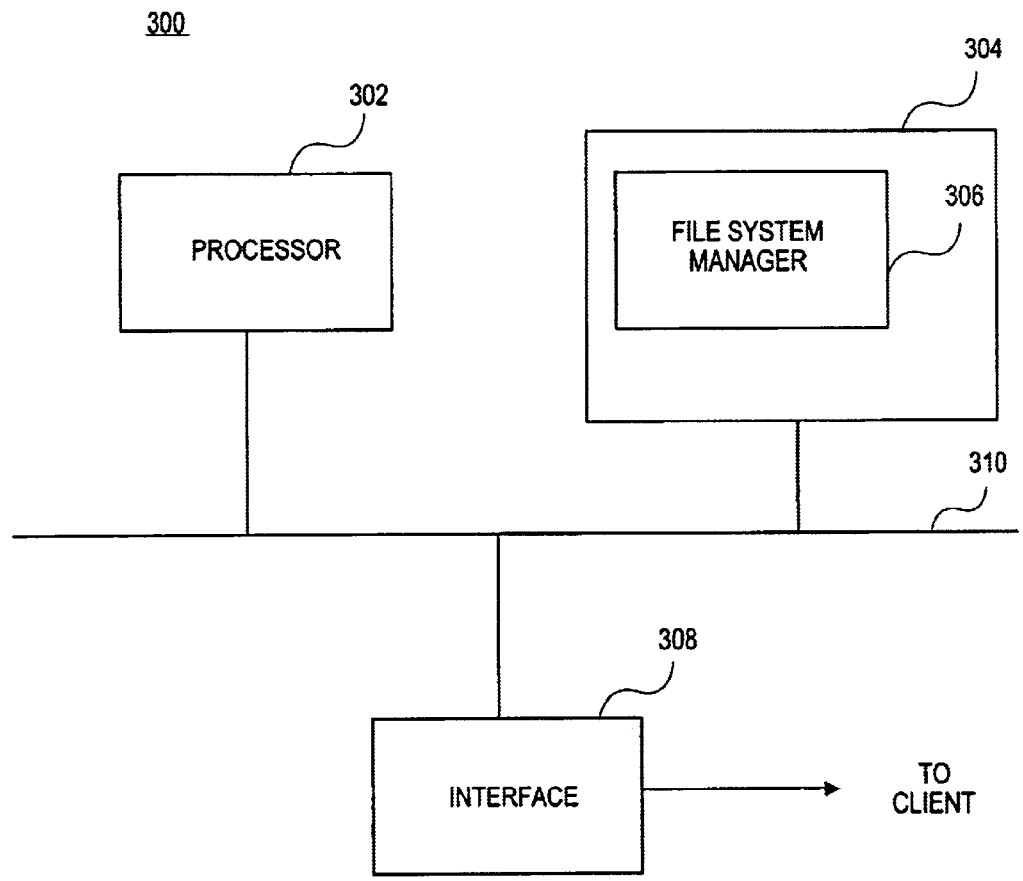
FIG. 3 is a block diagram of a server system in accordance with one embodiment of the invention.

FIG. 3 is a block diagram of a server system in accordance with one embodiment of the invention. FIG. 3 illustrates a server 300 that is representative of server 106, in accordance with one embodiment of the invention. As shown in FIG. 3, server 300 comprises a processor 302, a memory 304 and an interface 308, all connected by connection 310. Elements 302, 304, 308 and 310 of FIG. 3 are similar in structure and operation as corresponding elements 202, 204, 208 and 210 described with reference to FIG. 2. Although server 300 is shown with a processor 302, it can be appreciated that server 300 may operate without processor 302 by using another processor available to server 300 (e.g., processor 202), and still fall within the scope of the invention. For example, such a configuration may occur if the embodiments of the invention were incorporated into a personal computer where the client and server were connected by a PCI bus and both shared a single processor.

In one embodiment of the invention, memory 304 contains program instructions for a file system manager 306. File system manager 306 performs file management and provides access to a storage medium (not shown) containing a plurality of files. File system 306 performs file operations such as create, open, seek, read, write, rename, delete, copy, move, and so forth, in response to file requests received from file system interface 206. One example of file system interface 206 includes an ISM operating in accordance with the I$_2$O Specification, although the scope of the invention is not limited in this respect.

Figure 4:
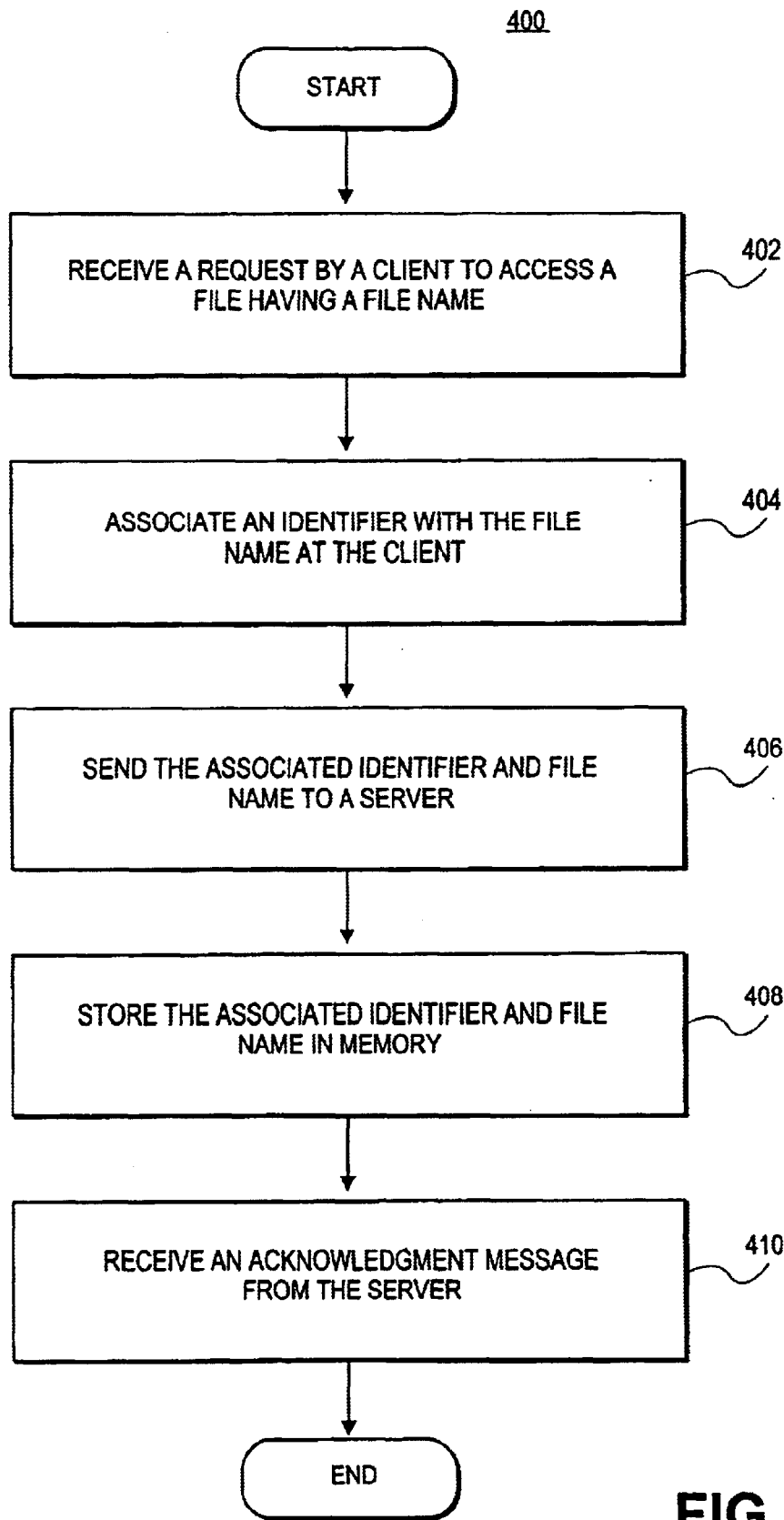
FIG. 4 is a block flow diagram of operations performed by a client system in accordance with one embodiment of the invention.
Figure 5:
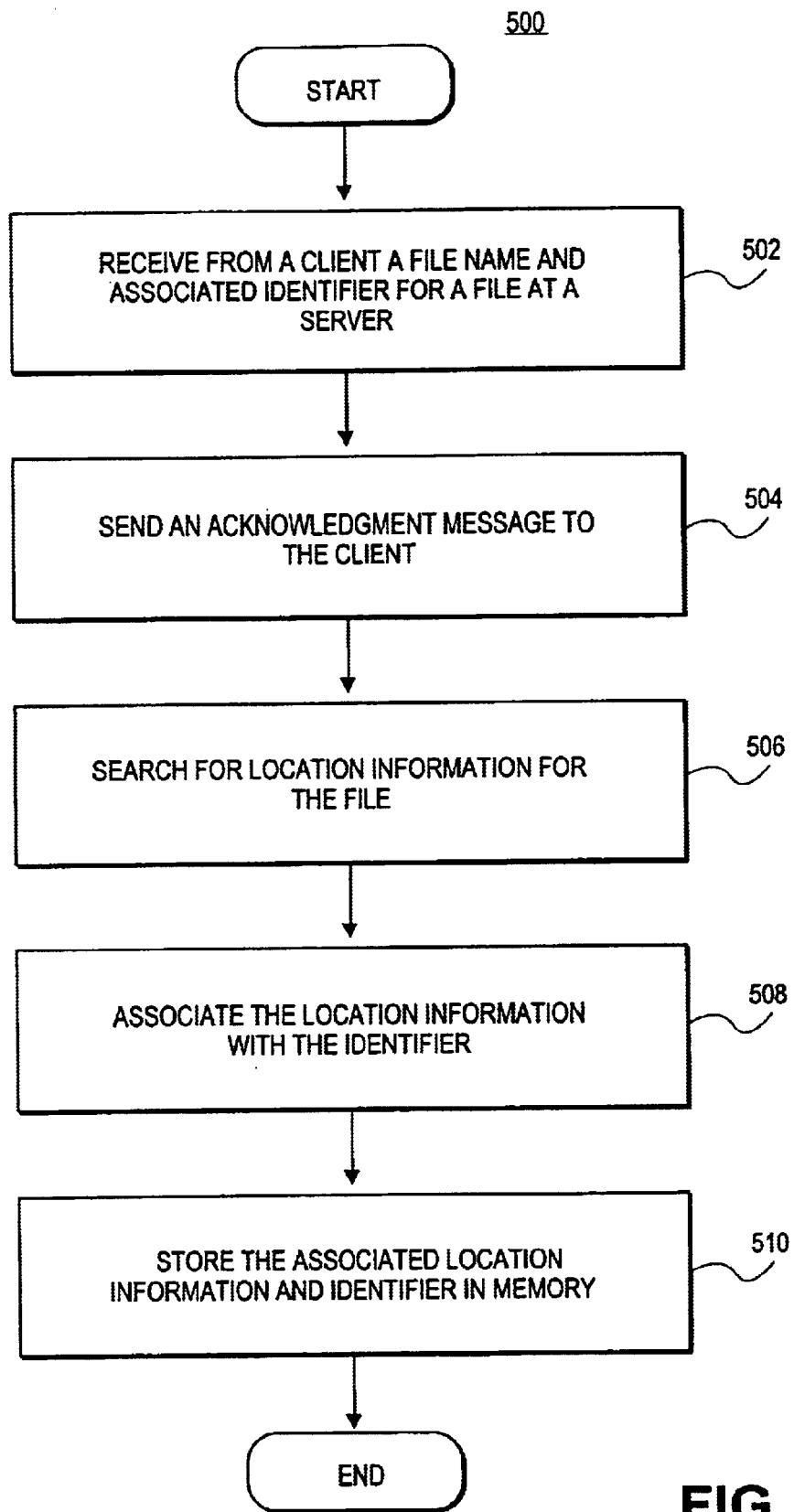
FIG. 5 is a block flow diagram of operations performed by a server system in accordance with one embodiment of the invention.

The operation of systems 100, 200 and 300 will be described in more detail with reference to FIGS. 4 and 5. Although FIGS. 4 and 5 presented herein include a particular sequence of operations, it can be appreciated that the sequence of operations merely provides an example of how the general functionality described herein may be implemented. Further, the sequence of operations does not necessarily have to be executed in the order presented unless otherwise indicated.

FIG. 4 is a block flow diagram of the operations performed by a client in accordance with one embodiment of the invention. In this embodiment of the invention, file system interface 206 operates as part of client 106. It can be appreciated that file system interface 206, however, can be implemented by any device, or combination of devices, located anywhere in a computer or network system and still fall within the scope of the invention.

As shown in FIG. 4, a client receives a request to access a file having a file name at block 402. The client associates the file name with an identifier at block 404. The client sends the associated identifier and file name to a server at block 406. The client stores the associated identifier and file name in memory at block 408. The client receives an acknowledgement message from the server at block 410.

Once the client assigns an identifier to a file, the identifier is used for future requests for the file. The client receives a second request at the client to access the file. The client retrieves the identifier associated with the file name from memory. The client sends the second request to the server using the associated identifier.

FIG. 5 is a block flow diagram of the operations performed by a server in accordance with one embodiment of the invention. In this embodiment of the invention, file system manager 306 operates as part of client 106. It can be appreciated that this functionality, however, can be implemented by any device, or combination of devices, located anywhere in a computer or network system and still fall within the scope of the invention.

As shown in FIG. 5, a server receives a file name and associated identifier for a file at block 502. The server sends an acknowledgement message to the client at block 504. The server searches for location information for the file at block 506. The server associates the location information with the identifier at block 508. The server stores the associated location information and identifier in memory.

Once the server indexes the location information for a file using the identifier, the server can use the identifier to access the location information for subsequent file requests. The server receives a second request to access the file having the identifier. The server retrieves the location information from memory using the identifier.

The operation of systems 100, 200 and 300, and the flow diagrams shown in FIGS. 4 and 5, may be better understood by way of example. An application program sends a request to read information from a file with a file name "test file one" to the host OS of system 100. A unique identifier in this context refers to a series of alphanumeric characters that when combined represent a unique word, value or binary string to the client, server and/or system with respect to other words, values or binary strings used by the client, server and/or system. The host OS passes the file request to file system interface 206. File system interface 206 generates a unique identifier "A123" and assigns it to file name "test file one." In this embodiment of the invention, the unique identifier "A123" may be a hexidecimal 32 bit number, for example. File system interface 206 creates a message "identify (test file one, A123)," and places it in an outbound message queue for transport over connection 104 to file system manager 306. The outbound message queue in this context refers to a queue such as first-in-first-out (FIFO) that is used to hold messages until the interconnect system can transport the message. File system interface 206 stores "test file one" with "A123" in a lookup table in memory 204.

File system manager 306 receives the message over connection 104. File system manager 306 parses the message and invokes the function "identify (test file one, A123) ." The term parses in this context refers to separating individual characters or sub-sets of characters from the message that represent, for example, commands, control words, file names, data, function calls, sub-routine names, flags and so forth. The term "invokes" in this context refers to a command sent to the processor to begin executing program instructions associated with a given function or sub-routine. This function takes as inputs "test file one" and "A123," and informs file system manager 306 that the file name "test file one" will be referenced in subsequent file requests as "A123." This may be accomplished by updating a lookup table in memory by storing the file name and unique identifier together as corresponding or linked terms, that is, one may be found by searching for the other. File system manager 306 searches for location information for file "A123," which is typically located on a storage device such as a hard drive. Examples of location information may include addressing information, device, cylinder number and track number, although the invention is not limited in scope in this respect. File system manager 306 associates the location information with identifier "A123," and stores the location information with identifier "A123" in a lookup table in memory 304. File system manager 306 sends an acknowledgement message to file system interface 206 that the file name identifier and location information have been received. An acknowledgement message in this context refers to a short message indicating that a previous message was received. The acknowledgement message may comprise a single bit, character, word or phrase, as desired by a particular system.

Subsequent file requests received by file system manager 306 will then use identifier "A123" when requesting operations for file name "test file one." For example, file system interface 206 receives a second request to perform a "delete" operation for "test file one." File system interface 206 retrieves the previously associated identifier "A123" for "test file one" from memory. File system interface 206 sends a message "delete('A123')" to file system manager 306. File system manager 306 receives the message "delete('A123')" and retrieves the location information for file name "test file one" using the identifier "A123." File system manager 306 then performs the requested file operation using the retrieved location information.

In one embodiment of the invention, file system interface 206 may be implemented as an OSM in accordance with the I$_2$O Specification and a particular host OS, such as the Linux OS version 2.3.99 pre-3 kernel available from "www.kernel.org" ("Linux Kernel"). In this embodiment of the invention, the OSM may further comprise a stream forest OSM, a stream tree OSM, and a class specification. A class in this context may refer to a specific interface definition. A tree in this context may refer to a collection of storage objects called cones. An object in this context may refer to an instance of a class. A cone in this context may refer to a storage object that supports read, write and lock capabilities, for example. A forest in this context may refer to a collection of trees.

In this embodiment of the invention, the stream forest OSM may be used to model a collection of file systems. The stream forest OSM may provide file naming operations, such as creating a name, erasing a name, or renaming a particular forest, for example. Further, open and close operations may also be supported. The tree OSM may be used to model a particular file system. A file may be modeled as a cone. The stream forest OSM may also function to support file operations, such as to name a file, rename it, erase it, lock it from change, read it or write it, for example.

The OSM may be designed to communicate with an ISM. The ISM may further comprise a stream forest ISM and a stream tree ISM. The stream forest ISM may support the file system naming capability of the OSM. In one embodiment of the invention, the stream tree ISM may support stream cone identifiers with lengths of $2^8$ characters. The stream tree ISM may also support $2^{16}$ open stream cones, as well as $2^{32}$ possible stream cones. The tree ISM may support $2^{64}$ bytes for all contained stream cones. It can be appreciated that these values do not limit the scope of the invention in this respect.

In operation, the stream tree OSM, stream forest OSM, stream tree ISM and stream forest ISM may all communicate using a messaging scheme in accordance with a class specification as discussed below. This messaging scheme will be referred to as a streaming messaging scheme, and will be discussed in further detail below. A host OS may use the functionality provided by the stream forest OSM and stream tree OSM. The host OS may use the stream forest OSM to model a grouping of file systems, and the stream tree OSM to model a particular file system, for example. The stream forest OSM may use the stream forest ISM to manage groupings of file systems within an IRTOS environment. The stream tree OSM may use the stream tree ISM to manage a file system within an I$_2$O Real-Time Operating System (IRTOS) environment. The stream forest OSM and stream tree OSM may communicate with the stream forest OSM and stream tree ISM, respectively, using the stream messaging scheme. This embodiment of the invention will be further described with reference to FIG. 7.

Figure 6:
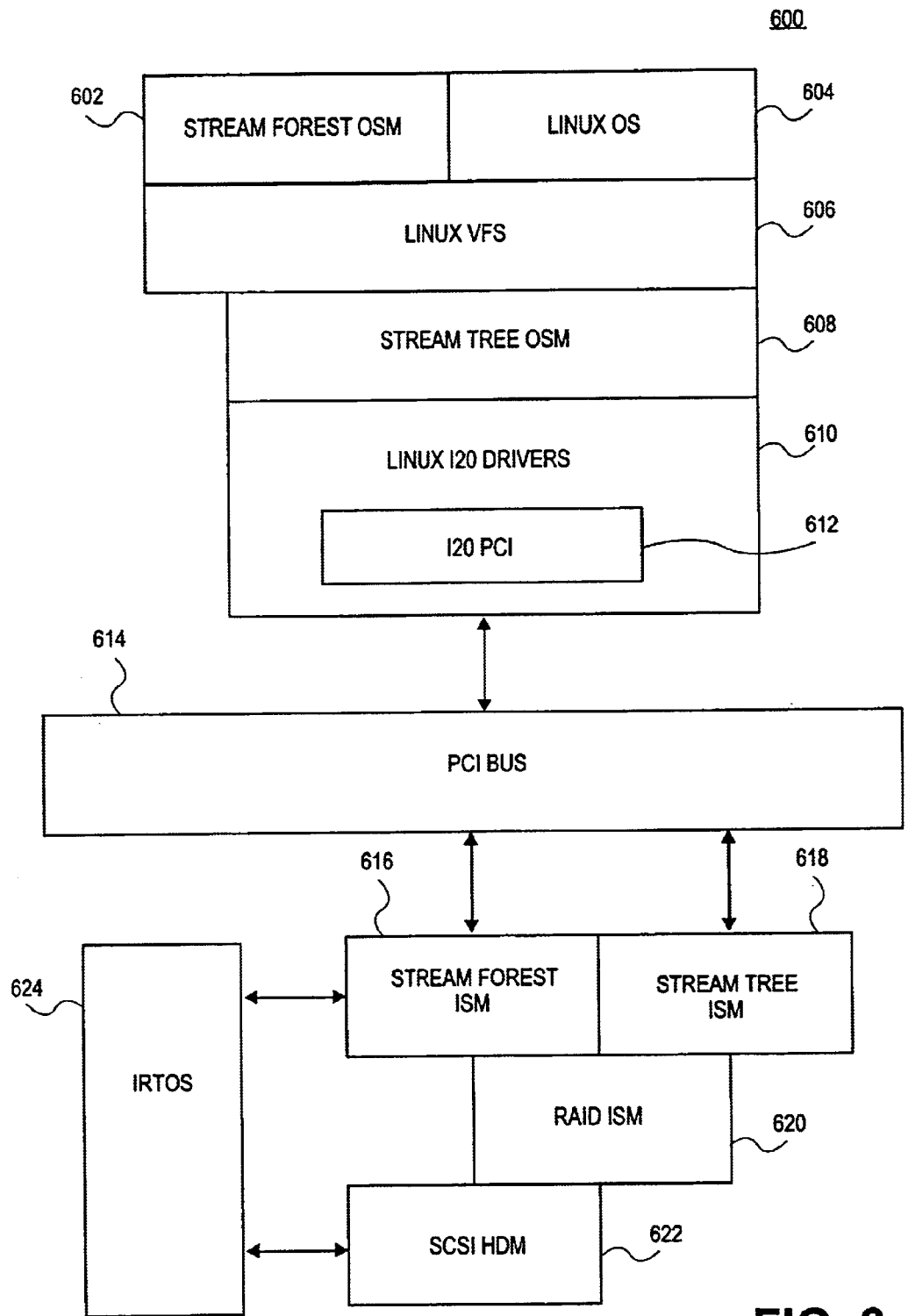
FIG. 6 illustrates a software architecture in accordance with one embodiment of the invention.

FIG. 6 illustrates a software architecture in accordance with one embodiment of the invention. As shown in FIG. 6, a system 600 may comprise a file system interface having a stream forest OSM 602, a Linux OS 604, a Linux Virtual File System (VFS) 606, a stream tree OSM 608, and one or more Linux I$_2$O drivers 610. Linux I$_2$O drivers 610 may operate in accordance with the Linux Kernel and the I$_2$O Specification. Linux I$_2$O drivers 610 may include PCI I$_2$O drivers 612. PCI I2O drivers 612 may operate in accordance with the PCI Specification and the I$_2$O Specification.

The file system interface communicates with a file system manager over a bus 614 that communicates signals in accordance with the PCI Specification. The file system manager may comprise a stream forest ISM 616, a stream tree ISM 618, a Redundant Array of Inexpensive Disks (RAID) ISM 620, a Small Computer System Interface (SCSI) HDM 622 and IRTOS 624.

In this embodiment of the invention, the modules shown in system 600 may be implemented using the C programming language, although the scope of the invention is not limited in this respect. Further, in this embodiment of the invention modules shown in system 600 support identifiers having a length of 255 characters.

Stream tree OSM 608 may be configured to provide access to a typical file system. Stream tree OSM 608 may be configured to support one or more Linux VFS required functions, as defined by the Linux Specification. Stream tree OSM 608 may be configured to support stream tree class messages, as discussed in more detail below. Stream tree OSM 608 may be configured to operate with Linux OS 604 using, for example, the Linux Kernel. Stream tree OSM 608 may support a stream tree ISM, such as stream tree ISM 618.

Stream forest OSM 602 may provide the function loctl( ) kernel interface. Stream forest OSM 602 may function to create a stream tree within a stream forest, using a function name such as "IOCTL_SF_TREECREATE." This function may accept as inputs, for example, an input buffer defined in the C language as follows:

```
struct ik_sf_treecreate {
    U32    SizeInBlocks;
    char   name[256];
}.
```

Stream forest OSM 602 may also function to rename an existing stream tree, using a function name such as "IOCTL_SF_TREERENAME." This function may accept as inputs, for example, an input buffer defined in the C language as follows:

```
struct ik_sf_treerename {
    char   IdentifierBeforeRename [256];
    char   IdentifierAfterRename [256];
}.
```

Stream forest OSM 602 may also function to erase an existing stream tree, using a function name such as "IOCTL_SF_TREEERASE." This function may accept as inputs, for example, an input buffer defined in the C language as follows:

```
struct ik_sf_treeerase {
    char   IdentifierToErase[256];
}.
```

Stream forest OSM 602 may use one or more of the following data structures. A data structure referred to herein as a "super block" may be used to represent the initial "inode" of a file system. An "inode" in this context may refer to a file node of the file system. A super block operation list may be a grouping of functions used to manipulate the super block. An inode record data structure may be used to represent each file node of the file system. An inode operation list may be a grouping of functions used to manipulate an inode. A file record data structure may be used to represent an abstract file within a file system. A file operation list may be used to support file operations. All of these data structures combined with operation list operations may be used to represent a file system.

Stream tree class messages may be issued for several of the data structures. A stream tree class message may be issued, for example, for the inode operations create, lookup, make directory ("mkdir"), remove directory ("rmdir"), and rename directory. A stream tree class message may be issued for various file operations, such as open, read, write, seek, and close.

Stream forest OSM 602 may register the contained file system with the identifier "i2ofs," for example, within the Linux kernel. Stream forest OSM 602 may use the NULL identifier for the root tree cone container, for example. Stream forest OSM 602 may use the identifier '.' for the current tree cone container, for example. Stream forest OSM 602 may use the identifier '..' for the parent tree cone container, for example.

System 600 may contain system descriptions for one or more of the following modules:
1. A MODULE_AUTHOR description for the kernel;
2. A MODULE_DESCRIPTION of "I2O Filesystem Offload Driver";
3. A module_init ( ) which may register the file system;
4. A module_exit ( ) which may un-register the file system;
5. A DECLARE_FSTYPE module which may have parameters of the i2ofs_type i2ofs, read super operation, and 0;
6. An OSM handle manager module that may have a first handle of zero that increases by 1 per used handle;
    a. An internal software interface AcquireHandle ( ) which may retrieve an unused handle; and
    b. An internal software interface ReleaseHandle (int) which may release a currently used handle into the free pool.

System 600 may also provide the function VFS i2ofs_read super (struct super_block *sb, void *options, int silent). This function may accept the inputs as defined in Table 1.

TABLE 1

| Variable Type | Variable Identifier | Description |
| --- | --- | --- |
| Struct super_block* | Sb | This input may specify the location where the super block should be set. |
| Void* | Options | This input may specify the options passed by mount. |
| int | Silent | This input may specify if the mount operation is silent. |

This function sets the values in the super block structure to 0. The following variables may be set as follows:
sb->s_blocksize=512.
sb->s_blocksize_bits=10.
sb->S_s_magic=I2OFS_SUPER_MAGIC
sb->s_op=the super_operations structure defined in the OSM.
The function may create a new inode using a module referred to as get_empty_inode( ).

The inode may be set to zero, with various associated variables having the following settings:

inode i_uid=20.
inode i_gid=20.
inode operations may be set to the pointer describing the inode operation list.
inode i_fop may be set to the point describing the file operation list.
inode I_mode may be set to S_IFDIRIS_IRUGOIS_IXUGO.
inode may be inserted into the inode hash table.
Sb->s_root may be set to d_alloc_root( ) of the root inode.

Each file system within VFS 606 may have at least one super block, which contains enough information about the file system to initiate activity of the file system. This super block may be implemented in a C structure struct super_block, as follows:

```
struct super_block {
    struct list_head s_list;
    kdev_t s_dev;
    unsigned long s_blocksize;
    unsigned long s_blocksize_bits;
    unsigned char s_lock;
    unsigned char s_dirt;
    struct file_system_type *s_type;
    struct super_operations *s_op;
    struct dquot_operations *dq_op;
    unsigned long s_flags;
    unsigned long s_magic;
    struct dentry *s_root;
    wait_queue_head_t s_wait;
    struct inode *s_ibasket;
    short int s_ibasket_count;
    short int s_ibasket_max;
    struct list_head s_dirty;
    struct list_head s_files;
    struct block_device *s_bdev;
};
```

The variable super_block->s_op may contain the following C functions and provide access to the super block.

```
struct super_operations {
    void    (*read_inode) (struct inode *);
    void    (*write_inode) (struct inode *)
    void    (*put_inode) (struct inode *);
    void    (*delete_inode) (struct inode *);
    void    (*put_super) (struct super_block *);
    void    (*write_super) (struct super_block *);
    void    (*statfs) (struct super_block *, s6truct statfs *);
    int     (*remount_fs) (struct super_block *, int *, char *);
    void    (*clear_inode) (struct inode);
    void    (*umount_begin) (struct super_block *);
};
```

An example of an inode interface may be as follows:

```
struct inode {
    struct list-head i_hash;
    struct list_head i_list;
    struct list_head i_dentry;
    unsigned long i_ino;
    unsigned int i_count;
    kdev_t i_dev;
    umode_t i_mode;
    nlink_t i_nlink;
```

-continued

```
    uid_t i_uid;
    gid_t i_gid;
    kdev_t i_rdev;
    loff_t I_size;
    time_t I_atime;
    time_t I_mtime;
    time_t I_ctime;
    unsigned long I_blksize;
    unsigned long I_blocks;
    unsigned long I_version;
    struct semaphore I_sem;
    struct semaphore I_zombie;
    struct inode_operations *I_op;
    struct file_operations *I_fop;
    struct super_block *I_sb;
    wait_queue_head_t I_wait;
    struct file_lock *I_flock;
    struct address_space *I_mapping;
    struct address_space I_data;
    struct dquot *I_dquot[MAXQUOTAS];
    struct pipe_inode_info *I_pipe.
    Struct block_dev ice I_bdev;
    Unsigned long I_state;
    Unsigned int I_flags;
    Unsigned char I_sock;
    Atomic_t I_writecount;
    Unsigned int I_attr_flags;
    __u32 I_generation;
};
```

The variable inode->i_op may contain the following C functions and provide method access to the super block, as follows:

```
struct inode_operations {
    struct file_operations *default_file_ops;
    int (*create) (struct inode *, const char *, int, int, struct inode **);
    struct dentry * (*lookup) (struct inode *, struct dentry *)
    int (*link) (struct dentry *, struct inode *, struct dentry *);
    int (*unlink) (struct inode *, struct dentry *);
    int (*symlink) (struct inode *, struct dentry *, const char *);
    int (*mkdir) (struct inode *, struct dentry *, int);
    int (*rmdir) (struct inode *, struct dentry *);
    int (*mknod) (struct inode *, struct dentry *, int, int);
    int (*rename)(struct inode *, struct dentry *, struct inode *,struct dentry *);
    int (*readlink) (struct dentry *, char *, int);
    struct dentry * (*follow_link) (struct dentry *, struct dentry *, unsigned int);
    void (*truncate) (struct inode *);
    int (*permission) (struct inode *, int);
    int (*revalidate) (struct dentry *);
    int (*setattr) (struct dentry *, struct iattr *);
    int (*getattr) (struct dentry *, struct iattr *);
};
```

System 600 also provides a function create (struct inode *, const char *, int, int, struct inode **). This function may accept the inputs set forth in Table 2.

TABLE 2

| Variable Type | Variable Identifier | Description |
| --- | --- | --- |
| struct inode* | ParentDirectory | This input may specify the input directory of the create operation. |
| const char* | NewName | This input may specify the name of the new file system object. |
| int | NewSize | This input may specify the new size of the object. |

TABLE 2-continued

| Variable Type | Variable Identifier | Description |
|---|---|---|
| Int | NewMode | This input may specify the new mode of the object. |
| struct inode** | NewInode | This input may specify the new inode of the created object. |

This function may create a new inode using get_empty_inode ( ). The function may initialize the new mode by attaching the const char * variable to it via dentry relationship. The function may initialize the new inode structure with the size specified. The function may initialize the new mode structure with the mode specified. The function may send a StreamConeCreate message to the stream tree ISM. The message may be configured as follows:

1. HANDLE may be retrieved from the OSM handle manager;
2. TYPE may be set to 1, indicating a file; and
3. SGL may be set to NewName.

The dereference of NewInode may be set with the new inode structure.

System 600 may also provide a function struct dentry *lookup (struct inode *, struct dentry *). This function may accept the inputs set forth in Table 3.

TABLE 3

| Variable Type | Variable Identifier | Description |
|---|---|---|
| struct inode* | ParentDirectory | This input may specify the input directory of the lookup operation. |

This function may send a StreamConeIdentify message to stream tree ISM 618. The message may be configured as follows:

1. PARENTHANDLE may be set to the handle identified within the ParentDirectory inode local data;
2. CHILDHANDLE may be set to a handle retrieved from the OSM handle manager;
3. ATTRIBUTES may be set to STREAMCONECREATE_QUERY; and
4. SGL may be set to Name.

The function may create a new inode using get_empty_inode ( ). The function may initialize the new inode by attaching the const char * variable to it via dentry relationship. The function may send a StreamConeGetInformation message to the stream tree ISM. The message may be configured as follows:

1. HANDLE may be set to CHILDHANDLE above; and
2. SGL may be set to a local data structure of type Information Result Block. The function may set the inode values from the Information Result Block. The function may set the dereference of the NewInode variable to the inode that has been created.

System 600 may provide the function mkdir (struct inode *, struct dentry *, int). This function may accept the inputs as set forth in Table 4.

TABLE 4

| Variable Type | Variable Identifier | Description |
|---|---|---|
| struct inode* | ParentDirectory | This input may specify the input directory of the mkdir operation. |
| Struct dentry* | Name | This input may specify the name of the object to create. |
| int | Mode | This input may specify the mode of the new directory. |

The function may send a StreamConeCreate message to create a directory. The message may be configured as follows:

1. HANDLE may be set to the handle identified in the mode structure input ParentDirectory;
2. TYPE may be set to 2; and
3. SGL may be set to the input Name that contains the actual name.

System 600 may provide the function rmdir (struct inode *, struct dentry *). This function may accept the inputs set forth in Table 5.

TABLE 5

| Variable Type | Variable Identifier | Description |
|---|---|---|
| struct inode* | ParentDirectory | This input may specify the input directory of the lookup operation. |
| struct dentry* | Name | This input may specify the name of the object to remove. |
| int | Length | This input may specify the length of Name in characters. |

This function may send a StreamConeErase message to remove a directory. The message may be configured as follows:

1. HANDLE may be set to the handle identified in the inode structure input ParentDirectory; and
2. SGL may be set to the input Name.

System 600 may also provide the function rename (struct inode *, struct dentry *, struct inode *, struct dentry *). This function may accept the inputs set forth in Table 6.

TABLE 6

| Variable Type | Variable Identifier | Description |
|---|---|---|
| struct inode* | OldDir | This input may specify the directory of the file to rename. |
| struct dentry* | OldName | This input may specify the name of the object to rename. |
| struct inode* | NewDir | This input may specify the new directory of the object. |
| struct dentry* | NewName | This input may specify the new name of the object. |

This function may send a StreamConeIdentify message to the ISM. The message may be configured as follows:

1. PARENTHANDLE may be set from OldDir inode internal storage for OSM handles;
2. CHILDHANDLE may be set to new handle retrieved from the OSM handle manager;
3. ATTRIBUTES may be set to STREAMCONECREATE_QUERY; and
4. SGL may be set to OldName.

The function may send a StreamConeRename message to the ISM. The message may be configured as follows:

1. HANDLE may be set to the CHILDHANDLE of StreamConeIdentify;
2. NEWPARENT may be set to NewDir inode internal storage for OSM handles; and
3. SGL may be set to NewName.

The function may send a StreamConeClose message to the ISM. The message may be configured as follows: HANDLE may be set to the previous HANDLE from StreamConeRename message.

System 600 may also provide the function truncate (struct inode *). This function may accept the inputs set forth in Table 7.

TABLE 7

| Variable Type | Variable Identifier | Description |
|---|---|---|
| struct inode* | File | This input may specify the file to truncate. |

The function may send a StreamConeResize message to the ISM. The message may be configured as follows:
1. HANDLE may be retrieved from the inode internal OSM handle storage; and
2. SIZE may be retrieved from the inode variable i_size.

Each file within VFS 606 may have at least one super block, which may contain enough information about the file system to initiate activity of the file system. This super block is detailed in the C structure struct super_block, such as the one described previously. The methods variable, f_op, may provide access to file operations. The struct super_operations *s_op function may provide access to the root inode, which may be desired for the OSM.

```
struct file {
    struct list_head f_1st;
    struct dentry *f_dentry;
    struct file_operations *f_op;
    atomic_t f_count;
    unsigned int f_flags;
    mode_t f_mode;
    loff_t f_pos;
    unsigned long f_reada;
    unsigned long f_ramax;
    unsigned long f_raend;
    unsigned long f_ralen;
    unsigned long f_rawin;
    struct fown_struct f_owner;
    unsigned int f_uid;
    unsigned int f_gid;
    int f_error;
    unsigned long f_version;
};
```

System 600 may provide one or more file operations described below. The variable f->s_op may contain the following C functions and may provide access to the super block.

```
struct file_operations {
    loff_t    (*llseek) (struct file *, off_t, int)
    ssize_t   (*read) (struct file *, char *, size_t, loff t *);
    ssize_t   (*write) (struct file *, const char *, size_t, loff_t *);
    int       (*readdir) (struct file *, void *, filldir_t);
    u_int     (*poll) (struct file *, struct poll_table_struct *);
    int       (*ioctl) (struct inode *, struct file *, unsigned int,
                  unsigned long);
```

-continued

```
    int       (*mmap) (struct file *, struct vm_area_struct *);
    int       (*open) (struct inode *, struct file *);
    int       (*release) (struct inode *, struct file *);
    int       (*fsync) (struct inode *, struct dentry *);
    int       (*fasynch) (int, struct file *, int);
    int       (*lock) (struct file *, int, struct file_lock *);
    ssize_t   (*readv) (struct file *, const struct iovec *, unsigned long,
                  loff_t *);
    ssize_t   (*writev) (struct file *, const struct iovec *, unsigned long,
                  loff_t *);
}.
```

System 600 may provide the function llseek (struct file *, off_t, int). This function may accept the inputs as set forth in Table 8.

TABLE 8

| Variable Type | Variable Identifier | Description |
|---|---|---|
| struct file* | File | This input may specify the file pointer to seek. |
| off_t | Offset | This input may specify the offset from Origin to seek to. |
| Int | Origin | This input may specify the Origin. |

This function may send a StreamConeSeek message to the ISM. The message may be configured as follows:

1. HANDLE may be set from node internal storage for OSM handles; and
2. NEWPOSITION may be set to the position obtained by calculation from Offset and Origin.

System 600 may provide the function read (struct file *, char *, size_t, loff_t). This function may accept the inputs set forth in Table 9.

TABLE 9

| Variable Type | Variable Identifier | Description |
|---|---|---|
| struct file* | File | This input may specify the file pointer to read. |
| char* | Buffer | This input may specify the buffer to read into. |
| Size_t | Size | This input may specify size in bytes to read. |
| loff_t | SeekChange | This input specifies how much data was read. |

This function may send a StreamConeRead message to the ISM. The message may be configured as follows:

1. HANDLE may be set from node internal storage for OSM handles; and
2. SGL may be set to Buffer and Size.

System 600 may provide the function write (struct file *, const char *, size_t, loff_t *). This function may accept the inputs set forth in Table 10.

TABLE 10

| Variable Type | Variable Identifier | Description |
| --- | --- | --- |
| struct file* | File | This input may specify the file pointer to read. |
| Const char* | Buffer | This input may specify the buffer to write. |
| Size_t | Size | This input may specify size in bytes to read. |
| Loff_t | SeekChange | This input specifies how much data was written. |

This function may send a StreamConeWrite message to the ISM. The message may be configured as follows:
1. HANDLE may be set from node internal storage for OSM handles; and
2. SGL may be set to Buffer and Size.

System 600 may provide the function readdir (struct file *, void *, filldir_t). This function may accept the inputs set forth in Table 11.

TABLE 11

| Variable Type | Variable Identifier | Description |
| --- | --- | --- |
| struct file * | File | This input may specify the file pointer to read. |

This function may send a StreamConeEnumerate message to the ISM. The message may be configured as follows:
1. HANDLE may be set from node internal storage for OSM handles;
2. ENUMERATOR is set to Count;
3. SGL may be set to Entry's file name buffer;
4. SGL's size may be set to 255.

System 600 may also provide a dentry interface as follows:

```
struct dentry {
    int d_count
    unsigned int d_flags;
    struct inode * d_inode;
    struct dentry *d_parent;
    struct dentry *d_mounts;
    struct dentry *d_covers;
    struct list_head d_ash;
    struct list_head d_lru;
    struct list_head d_child;
    struct list_head d_subdirs;
    struct list_head d_alias;
    struct qstr d_name;
    unsigned long d_time;
    struct dentry_operations *d_op;
    struct super_block *d_sb;
    unsigned long d_reftime;
    void *d_fsdata;
    unsigned char d_iname[DNAME_INLINE_LEN];
};
```

Stream tree ISM 618 may support one or more stream tree class messages, as defined herein. Stream tree 618 may function and support messages from a stream tree OSM, such as stream tree OSM 608. Stream forest ISM 616 may support stream forest class messages, as defined herein. Stream forest ISM 616 may function and support messages from a stream forest OSM, such as stream forest OSM 602.

Stream forest ISM 616 may include a user interface. The user interface may include a user screen that may display one or more stream trees on initialization. A user may be able to create new stream trees. When creating new stream trees, the user may be presented with a screen asking for size and identification. If a stream tree is created, a stream tree class object may be created. The user may also be able to erase stream trees. The user interface may provide for confirmation of erasure of stream trees. Stream forest messages may be handled and tree objects created as appropriate.

System 600 may provide the message StreamConeCreate. This message may be used to create a new stream cone that will store information, and may accept the inputs as set forth in Table 12.

TABLE 12

| Variable Type | Variable Identifier | Description |
| --- | --- | --- |
| U32 | HANDLE | This input may specify the handle that should be closed. |
| U32 | TYPE | This input may specify the type to create. 1 indicates a file and 2 indicates a directory. |
| SGL | SGL | Specifies the identifier. |

System 600 may also provide the message StreamConeEnumerate. This message may be used to list one or more stream cones within a stream cone container, and may accept the inputs as set forth in Table 13.

TABLE 13

| Variable Type | Variable Identifier | Description |
| --- | --- | --- |
| U32 | HANDLE | This input may specify the handle that should be closed. |
| U32 | ENUMERATOR | This input may specify a zero-based index indicating which entry should be enumerated into the SGL. |
| SGL | SGL | Specifies the location of the enumerated stream cone identifier. |

System 600 may retrieve the inode relating to HANDLE from the handle manager. When an enumerator is set to 0, the "ext2fs" library call dir_iterate( ) may be used with the inode relating to handle as the parent to generate a list of stream cone identifiers on the "ext2" filesystem. A list entry corresponding to the ENUMERATOR index may be copied into SGL.

System 600 may provide the message StreamConeErase. This message is used to erase a stream cone identifier, and may accept the inputs as set forth in Table 14.

TABLE 14

| Variable Type | Variable Identifier | Description |
| --- | --- | --- |
| U32 | HANDLE | This input may specify the handle that should be closed. |
| SGL | SGL | This input may specify the name of the identifier that should be erased. |

System 600 may provide the message StreamConeGetInformation. This message may be used to retrieve information about the stream cone, and may accept the inputs as set forth in Table 15.

TABLE 15

| Variable Type | Variable Identifier | Description |
|---|---|---|
| U32 | HANDLE | This input may specify the handle where information should be retrieved from. |
| SGL | SGL | This input may specify the name of the identifier that should be erased. |

System 600 may provide the message StreamConeIdentify. This message may be used to map a handle identifier to a string identifier, and may accept the inputs as set forth in Table 16.

TABLE 16

| Variable Type | Variable Identifier | Description |
|---|---|---|
| U32 | PARENT HANDLE | This input may specify the parent handle stream cone container. |
| U32 | CHILD HANDLE | This input may specify the child handle that should be mapped to the stream cone identifier. |
| U32 | ATTRIBUTES | This input may specify the attributes of the identified stream cone. |
| SGL | SGL | This input may specify the name of the identifier. |

System 600 may provide the message StreamConeLock. This message may be used to lock a byte range of a file, and may accept the inputs as set forth in Table 17.

TABLE 17

| Variable Type | Variable Identifier | Description |
|---|---|---|
| U32 | HANDLE | This input may specify the parent handle stream cone container. |
| U64 | INDEX | This input may specify the byte index that should be locked. |
| U64 | SIZE | This input may specify the size in bytes that should be locked. |

System 600 may provide the message StreamConeRead. This message may be used to read a block from a stream cone, and may accept the inputs as set forth in Table 18.

TABLE 18

| Variable Type | Variable Identifier | Description |
|---|---|---|
| U32 | HANDLE | This input may specify the parent handle stream cone container. |
| U64 | SIZE | This input may specify the size of the block to read. |
| SGL | SGL | This input may specify where in memory the file should be stored. |

System 600 may also provide a message StreamConeRelease. This message may be used to close an identification of the specified handle, and may accept the inputs as set forth in Table 19.

TABLE 19

| Variable Type | Variable Identifier | Description |
|---|---|---|
| U32 | HANDLE | This input may specify the handle that should be closed. |

This function may unlink HANDLE from the inode identifier.

System 600 may provide a message StreamConeRename. This message may be used to rename a stream cone, and may accept the inputs as set forth in Table 20.

TABLE 20

| Variable Type | Variable Identifier | Description |
|---|---|---|
| U32 | HANDLE | This input may specify the handle that should be renamed. |
| U32 | NEWPARENT | This input may specify the current or new parent handle. |
| SGL | SGL | This input may specify the name of the new SGL. |

System 600 may also provide a message StreamConeResize. This message is used to resize a stream cone, and may accept the inputs as set forth in Table 21.

TABLE 21

| Variable Type | Variable Identifier | Description |
|---|---|---|
| U32 | HANDLE | This input may specify the handle that should be renamed. |
| U64 | SIZE | This input may specify the new size of the stream cone. |

System 600 may provide a message StreamConeSeek. This message is used to change the position of a stream cone, and may accept the inputs as set forth in Table 22.

TABLE 22

| Variable Type | Variable Identifier | Description |
|---|---|---|
| U32 | HANDLE | This input may specify the handle that should be renamed. |
| U64 | NEW POSITION | This input may specify the new position of the stream cone. |

System 600 may provide a message StreamConeGetInformation. This message may be used to set information regarding the stream cone, and may accept the inputs as set forth in Table 23.

TABLE 23

| Variable Type | Variable Identifier | Description |
|---|---|---|
| U32 | HANDLE | This input may specify the handle that should have information set. |
| SGL | SGL | This input may specify the information set block. |

System 600 may provide a message StreamConeUnlock. This message may be used to unlock a previously set byte lock range, and may accept the inputs as set forth in Table 24.

TABLE 24

| Variable Type | Variable Identifier | Description |
|---|---|---|
| U32 | HANDLE | This input may specify the handle that should be unlocked. |
| U64 | INDEX | This input may specify the start byte of the range of bytes to unlock. |
| U64 | BYTECOUNT | This input may specify the byte count to unlock. |

System 600 may provide a message StreamConeWrite. This message may be used to write a block to a stream cone, and may accept the inputs as set forth in Table 25.

TABLE 25

| Variable Type | Variable Identifier | Description |
|---|---|---|
| U32 | HANDLE | This input may specify the handle that should be written. |
| U64 | BYTECOUNT | This input may specify the count in bytes that should be written. |
| SGL | SGL | This input may specify the block to be written. |

While certain features of the embodiments of the invention have been illustrated as described herein, many modifications, substitutions, changes and equivalents will now occur to those skilled in the art. It is, therefore, to be understood that the appended claims are intended to cover all such modifications and changes as fall within the true spirit of the embodiments of the invention.

What is claimed is:

1. A computer-implemented method to represent a file name with an identifier to improve performance of an interconnect system, comprising:

receiving a first request by a file system interface for a client to access a file having a file name;

generating an identifier for said file name by said client in response to said first request using a stream cone messaging system, with said identifier to represent said file name and comprise a fewer number of bits than said file name; and sending said first request to a server with said identifier and said file name.

2. The method of claim 1, further comprising storing said identifier and file name in memory.

3. The method of claim 1, further comprising receiving an acknowledgement message from said server.

4. The method of claim 1, further comprising:

receiving a second request at said client to access said file;

retrieving said identifier associated with said file name from said memory; and sending said second request to said server using said associated identifier.

5. The method of claim 4, wherein said first and second requests specify a file operation.

6. A computer-implemented method to represent a file name with an identifier to improve performance of an interconnect system, comprising:

receiving a first request from a client at a server to access a file having a file name and identifier, said identifier to represent said file name and to comprise a fewer number of bits than said file name, with said identifier generated by a client in response to said first request using a stream cone messaging system; and sending an acknowledgement message to said client.

7. The method of claim 6, further comprising:

searching for location information for said file;

associating said location information with said identifier; and storing said location information and said identifier in memory.

8. The method of claim 7, further comprising:

receiving a second request at said server to access said file using said identifier; and retrieving said location information from said memory using said identifier.

9. A computer-implemented method to represent a file name with an identifier to improve performance of an interconnect system, comprising:

receiving a file request having a file name by a file system interface for a client;

generating an identifier for said file name using a stream cone messaging system;

sending said identifier and said file name to a server;

searching for location information using said file name; and storing said location information with said identifier.

10. The method of claim 9, further comprising sending an acknowledgement message to said client.

11. A computer-implemented method to represent a file name with an identifier to improve performance of an interconnect system, comprising:

receiving a file request with a file name by a file system interface for a client;

generating an identifier for said file name by said file system interface in response to said first request using a stream cone messaging system, said unique identifier to represent said file name and comprise a fewer number of bits than said file name; and sending said unique identifier and file name to a file system manager.

12. The method of claim 11, further comprising:

receiving said unique identifier and said file name at said file system manager;

searching for file information using said file name; and storing said file information using said unique identifier.

13. A computer-readable medium tangibly embodied with software for execution by a computer to represent a file name with an identifier to improve performance of an interconnect system, comprising:

a storage medium;

said storage medium including stored instructions that, when executed by a processor, result in receiving a first request by a file system interface for a client to access a file having a file name, generating an identifier for said file name by said client in response to said first request using a stream cone messaging system, with said identifier to represent said file name and comprise a fewer number of bits than said file name, and sending said first request to a server with said identifier and said file name.

14. The article of claim 13, wherein the stored instructions, when executed by a processor, further results in storing said identifier and file name in memory.

15. The article of claim 13, wherein the stored instructions, when executed by a processor, further results in receiving an acknowledgement message from said server.

16. The article of claim 13, wherein the stored instructions, when executed by a processor, further results in receiving a second request at said client to access said file, retrieving said identifier associated with said file name from said memory, and sending said second request to said server using said associated identifier.

17. A computer-readable medium tangibly embodied with software for execution by a computer to represent a file name with an identifier to improve performance of an interconnect system, comprising:

a storage medium;

said storage medium including stored instructions that, when executed by a processor, result in receiving a file request having a file name by a file system interface for a client, generating an identifier for said file name by said client in response to said first request using a stream cone messaging system, said identifier to represent said file name and comprise a fewer number of bits than said file name, sending said identifier and said file name to a server, searching for location information using said file name, and storing said location information with said identifier.

18. The article of claim 17, wherein the stored instructions, when executed by a processors further result in sending an acknowledgement message to said client.

19. An apparatus to represent a file name with an identifier to improve performance of an interconnect system, comprising:

a file system interface for a client to receive a request for a file having a file name, said client to generate a unique identifier for said file name in response to said request using a stream cone messaging system, said unique identifier to represent said file name and comprise a fewer number of bits than said file name, and send said unique identifier and said file name to a server; and an interconnect system connected to said client to communicate said unique identifier and said file name to said server.

20. The apparatus of claim 19, further comprising a server to receive said unique identifier and file name, said server to locate information for said file and store said information using said unique identifier.

21. An apparatus to represent a file name with an identifier to improve performance of an interconnect system, comprising:

a file interface system for a client to generate an identifier for a file name in response to a file request using a stream cone messaging system, said identifier to represent said file name and comprise a fewer number of bits than said file name;

a server to locate file information using said file name and store said file information using said identifier; and an interconnect system to transport said file name and said identifier between said client and said server.

22. The apparatus of claim 21, wherein said client comprises an operating system service module.

23. The apparatus of claim 21, wherein said server comprises an intermediate service module.

24. The apparatus of claim 21, wherein said interconnect system operates in accordance with a peripheral component interconnect system and an $I_2O$ system.

25. An apparatus to represent a file name with an identifier to improve performance of an interconnect system, comprising:

a file system interface for a client to receive a request for a file having a file name and generate a unique identifier for said file name in response to said request using a stream cone messaging system, said identifier to represent said file name and comprise a fewer number of bits than said file name;

a file system manager to locate file information using said file name and store said file information using said unique identifier; and a communications system to communicate said unique identifier and said file name between said file system interface and said file system manager.

26. The apparatus of claim 25, wherein said communications system campuses;

a communications medium comprising at least one of a group comprising twisted pair wire, co-axial cable, fiber optic and radio-frequencies; and a communications interface to operate in accordance with a set of communication protocols.

* * * * *

UNITED STATES PATENT AND TRADEMARK OFFICE
CERTIFICATE OF CORRECTION

PATENT NO. : 6,928,426 B2
DATED : August 9, 2005
INVENTOR(S) : Dake

It is certified that error appears in the above-identified patent and that said Letters Patent is hereby corrected as shown below:

Column 2,
Line 16, delete "requester" and insert -- requestor --.

Column 5,
Line 51, delete "ETF" and insert -- IETF --.

Column 13,
Lines 12 and 17, delete "mode" and insert -- inode --.

Column 14,
Line 16, delete "mode" and insert -- inode --.

Column 20,
Lines 51-52, delete "StreamConeGetInformation" and insert
-- StreamConeSetInformation --.

Column 23,
Line 22, delete "processors" and insert -- processor, --.

Column 24,
Line 36, delete "campuses;" and insert -- comprises: --.

Signed and Sealed this

Eleventh Day of October, 2005

JON W. DUDAS
*Director of the United States Patent and Trademark Office*